United States Patent
Taylor

[15] 3,688,795
[45] Sept. 5, 1972

[54] LIQUID LEVEL GAUGE AND VALVE

[72] Inventor: Carl C. Taylor, Garland, Tex. 57040

[73] Assignee: Rochester Gauges, Inc. of Texas, Dallas, Tex.

[22] Filed: Sept. 14, 1970

[21] Appl. No.: 71,943

[52] U.S. Cl..............................137/558, 73/DIG. 5
[51] Int. Cl..............................................F16k 37/00
[58] Field of Search............73/317, DIG. 5; 116/118; 137/558

[56] References Cited

UNITED STATES PATENTS

| | | | |
|---|---|---|---|
| 1,798,434 | 3/1931 | Ruopp | 73/DIG. 5 |
| 1,950,142 | 3/1934 | Hastings et al. | 73/317 |
| 2,497,969 | 2/1950 | Anderson | 137/558 X |
| 2,992,560 | 7/1961 | Morgan et al. | 73/317 |
| 3,256,907 | 6/1966 | Clark et al. | 137/558 |

Primary Examiner—Henry T. Klinksiek
Attorney—H. Mathews Garland

[57] ABSTRACT

A filling and withdrawal valve in combination with a liquid level indicator particularly adapted for tanks for liquids such as liquified petroleum gases. The level indicator includes a float coupled by a pair of bevel gears to a vertical shaft extending in a valve housing to a magnetically coupled liquid level indicator. The level indicator dial is provided in a top reading or a combined top and side reading form. Each form of the indicator is isolated from tank pressure and is removable with gas in the tank.

4 Claims, 5 Drawing Figures

PATENTED SEP 5 1972
3,688,795
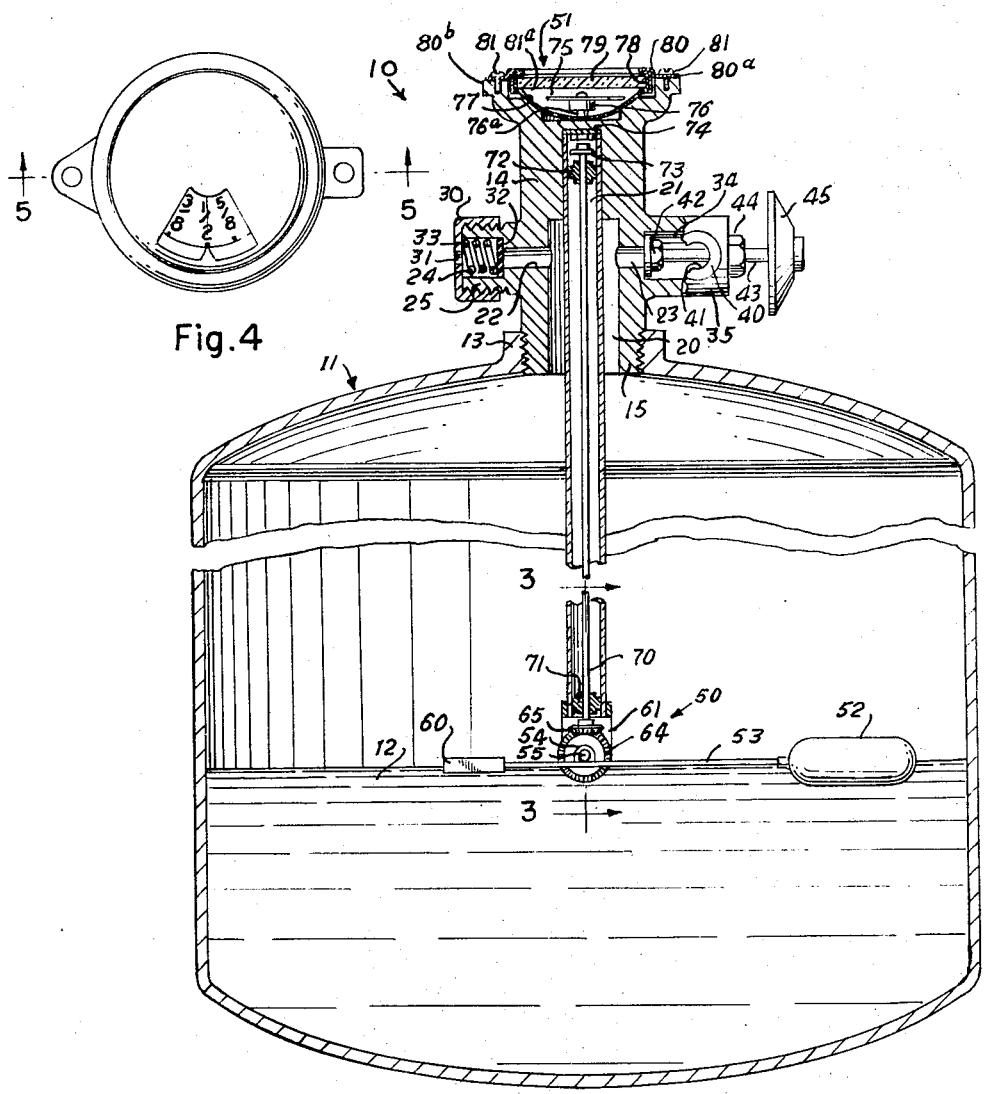
Fig. 4
Fig. 1
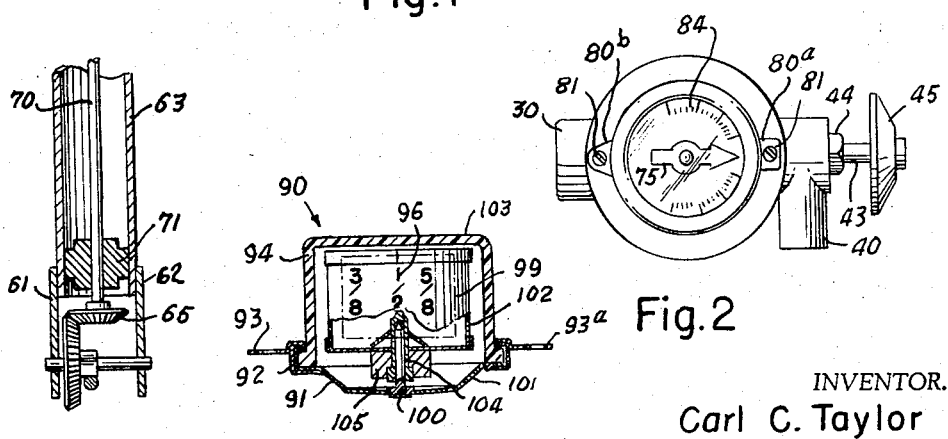
Fig. 3
Fig. 5
Fig. 2
INVENTOR.
Carl C. Taylor
BY W. Mathews Garland
ATTORNEY

LIQUID LEVEL GAUGE AND VALVE

This invention relates to liquid level gauges and valves and more particularly to a combined unit which serves a dual function of a gauge for measuring liquid level in a tank and a filling and dispensing valve for the tank.

The storage of liquids of the liquefied petroleum gas type which are used for such purposes as residential and industrial heating, is a particular problem in view of the fact that they are stored as a liquid under pressure and thus must be given special care. It is therefore desirable that means be devised for minimizing the possibilities of escape of the vaporized liquids stored while providing means for withdrawing fluid from and putting fluid into tanks along with means for indicating the quantity of the liquids in the tanks. Reduction in the number of openings in the tanks along with the routes of escape of the stored liquids through the valve and indicating mechanism is desirable. The combined liquid level gauge and valve embodying the invention provides a particularly suitable solution to these problems.

It is a particularly important object of this invention to provide a new and improved liquid level gauge and valve.

It is another object of the invention to provide apparatus of the character described which is especially useful with a tank for liquid of a specific gravity less than water under pressure.

It is another object of the invention to provide a liquid level gauge and valve of the character described which requires only a single tank opening thereby adapting the apparatus to certain existing single opening tanks and further eliminating the additional possibilities of leaks inherent in a multiple opening tank.

It is a further object of the invention to provide apparatus of the character described which employs a single housing for a valve and liquid level indicator.

It is another object of the invention to provide a liquid level gauge and valve which includes a magnetically coupled gauge or indicator so that no opening communicating with the tank is required for the gauge.

It is a further object of the invention to provide apparatus of the character described which employs a single housing for a valve and liquid level indicator.

It is another object of the invention to provide a liquid level gauge and valve which includes a magnetically coupled gauge or indicator so that no opening communicating with the tank is required for the gauge.

It is a further object of the invention to provide apparatus of the character described in which the gauge dial and related apparatus may be removed and repaired or replaced without affecting the pressure tight integrity of the tank and the indicator and valve system and without interfering with any of the other valve and indicator apparatus.

It is another object of the invention to provide apparatus of the character described which utilizes either a top reading dial or a combined top and side reading dial.

It is still a further object of the invention to provide a combined liquid level gauge and tank valve which is simple in construction and may be manufactured at a relatively low cost.

Still further objects and advantages will be apparent from reading the following description of one form of apparatus embodying the invention taken in conjunction with the accompanying drawings wherein:

FIG. 1 is a view in section of a liquid tank equipped with a combined liquid level gauge and valve embodying the invention, showing the tank partially filled with a liquid;

FIG. 2 is a top view in elevation of the combined liquid gauge and valve only;

FIG. 3 is an enlarged fragmentary view in section of the gear system of the indicator taken along the line 3—3 of FIG. 1;

FIG. 4 is a top view in elevation of a top and side reading dial useful in the invention; and FIG. 5 in a side view in elevation of the dial shown in FIG. 4.

Referring to the drawings, a combined liquid level gauge and valve 10 embodying the invention is connected with a tank 11 containing a liquid 12 to be measured by and dispensed through the apparatus of the invention. The tank 11 is an integral structure having a single flanged, internally threaded fitting portion 13 providing a single opening for communication with the interior of the tank. The indicator and valve apparatus 10 has a unitary non-magnetic body 14 which is externally threaded along its lower end portion 15 into the tank fitting 13. The body 14 has a first internal lower chamber portion 20 providing a flow passage which communicates at its lower end with the interior of the tank 11 and at its upper end with an upper reduced chamber portion 21 disposed coaxial with the chamber portion 20.

The body 14 is provided with a transverse bore defining a relief passage 22 and a filling and withdrawal passage 23 communicating with the chamber 20 on opposite sides thereof. The passage 23 connects with an enlarged relief valve cavity 24 in an externally threaded integral fitting 25. An internally threaded cap 30 having a relief port 31 is secured on the fitting 25. A relief valve 32 is held in the relief valve cavity 24 over the outward open end of the bore 22 by a spring 33 confined in the cavity by the cap 30. Sufficient predetermined pressure within the flow passage 22 compresses the spring moving the valve 32 outwardly to permit fluid escape from the tank through the chamber 20, the bore 22 and the cavity 24 through the port 31.

The flow passage 23 communicates with an enlarged chamber 34 in a valve fitting 35 formed integral on the valve body. The fitting 35 has a nozzle or connection portion 40 provided with a port 41 communicating with the chamber 34. A valve 42 is movably supported over the opening of the flow passage 23 into the chamber 34 to control fluid flow between the chamber 34 and the flow passage thereby controlling both the entrance of fluids into the tank and the withdrawal of fluids from the tank through the valve. The valve 42 is supported on a stem 43 having a threaded portion, not shown, extending through an internally threaded fitting 44 secured in the end of the body fitting 35 so that rotation of the valve stem 43 moves the valve 42 toward or away from its closure position over the flow passage 23 in the chamber 34, depending upon the direction of rotation of the valve stem. A handle 45 is secured on the outer end portion of the valve stem for rotation of the stem to open and close the valve 42. Fluid communication is thus provided through the valve with the interior of the tank along the chamber 20, the flow passage 23, around the valve 42 into the chamber 34, and from the chamber 34 through the port 41 in the member 40. The tank may be filled or fluid may be withdrawn from the tank through the valve along this path.

The liquid level indicator of the apparatus includes a float assembly 50 magnetically coupled with a visual dial indicator 51. The assembly 50 has a float 52 mounted on one end of a rod 53 pivotally supported by a U-shaped bracket 54 disposed around a shaft 55. A counterweight 60 is secured on the other end of the rod 53. The nature of the liquefied fluids in the tank is such that the pressure may be fairly substantial so that the float 52 must be of a rather heavy material resistant to collapse. A preferred partially submerged float position is obtained by use of the counterweight 60. The shaft 55 is supported from a pair of spaced arms 61 and 62 suspended from a vertical tubular member 63 which extends upwardly through the chamber 20 and is tightly fitted along its upper end portion in the upper reduced chamber portion 21 of the body 14. A vertical bevel gear 64 is secured on the shaft 55 meshing with a horizontal bevel gear 65 on the lower end of a vertical shaft 70 disposed along the axis of the tube 63. The shaft 70 is held by a lower bearing 71 and an upper bearing 72 tightly fitted within the tube 63.

A magnet 73, which may be of the horseshoe type, is mounted on the upper end of the rod 70 below a suitable integral wall portion 74 of the body 14 closing the upper end of the reduced chamber portion 21. The dial indicator 51 has a pointer 75 mounted on a magnet 76 pivoted on a shaft 76a so that it revolves responsive to the rotation of the magnet 73. The indicator has a housing formed by a dish shaped base 77 and an annular ring 78. A glass cover 79 is clamped between the ring and base. A flange ring 80 with tabs or ears 80a and 80b is secured by screws 81 to the body to hold the indicator in place in a cavity 81a at the upper end of an enlarged flange portion 82 of the body 14. The upwardly facing concave surface of the base 77 is suitably inscribed with a scale 84 graduated to show the quantity of liquid in the tank. Since the dial indicator is isolated from the tank pressure and coupled only magnetically, it may be removed and replaced or repaired with the tank under pressure.

While the dial indicator 51 is top reading only, FIGS. 4 and 5 show a combined top and side reading form of dial indicator 90 which may be substituted for the dial indicator 51. The indicator 90 includes a flanged dish shaped base 91 clamped within a flange ring 92 which has tabs 93 and 93a for securing by the screws 81 to the valve body 14 in exactly the same manner as the dial indicator 51. A cylindrical cap 94 having a bottom external annular flange 95 is clamped between the ring 92 and the base 91, FIG. 5, to provide a cover for the dial indicator. The cap 94 is preferably formed of a suitable plastic material externally finished along its top and side wall portions in a suitable manner to render it translucent except for transparent side and top window portions. As shown in FIG. 5 the side portion is inscribed with a vertical indicator line 96. As shown in FIG. 4 a top clear window 94a has an inscribed indicator line 97 and arrow point 98. A cylindrical dial indicator 99 is pivotally supported within the cap 94 on the base 91 by a shaft 100 secured at its bottom end with the base. The dial 99 comprises a circular base 101, a cylindrical side wall member 102 and a top cap 103. Both the top 103 and the side wall member 102 are inscribed with suitable markings for indicating the liquid level within the tank. As shown in FIG. 4, fraction markings on the top 103 may be observed relative to the line 97 and arrow 98 for reading liquid level from the top of the device, while, similarly, from the side of the device, fraction markings on the wall member can be seen relative to the vertical indicator line 96. A bearing sleeve 104 is secured through the base 101 to a magnet 105 on the bottom of the base. Thus, the cylindrical indicator dial along with the magnet are supported on the bearing sleeve for rotation on the shaft 100. The magnet 105 is driven responsive to the position of the magnet 73 so that the dial indicator 99 turns with changes of liquid level in the tank for showing the liquid level in the tank through both the side and the top of the cap 94. The dial indicator 90 is removed and repaired or replaced with liquid under pressure in the tank.

The operation of the combined valve and liquid level indicator is generally as follows. The tank 11 is initially filled with the liquid 12, which may be a liquefied petroleum gas used for such purposes as heating and cooking. The liquid 12 is introduced into the tank through the fitting 40 by coupling a filling hose, not shown, to the fitting and opening the valve 42 by rotation of the handle 45 and its stem 43 thereby backing the valve 42 off from the opening into the flow passage 23. The liquid is introduced through the fitting 40, the chamber 34 around the valve 42, and through the passage 23 and the chamber portion 20 in the valve body into the interior of the tank. The spring 33 holds the relief valve 32 over the open end of the passage 22 so that none of the liquid escapes through the relief valve so long as the pressure in the tank remains below a predetermined safe level. When the desired quantity of liquid 12 is introduced into the tank, the filling hose is disconnected from the fitting 40 and the valve 42 is closed by the handle 45. As the liquid level within the tank rises, the partially submerged float 52 is lifted by the bouyant force of the liquid. If the tank is initially empty when filling begins, the float will be resting near the bottom of the tank; and as the liquid level rises, the float will be lifted. In terms of the relative positions of the components of the float system shown in FIG. 1, the float is lifted in an arc upwardly to the right such that the rod 53 revolves about the axis of the shaft 55. As the float is raised, the rod 53 revolves the shaft 55 in a counterclockwise direction thereby rotating the gear 64 counterclockwise as seen in FIG. 1. As the bevel gear 64 revolves counterclockwise, the bevel gear 64 also is rotated in a counterclockwise direction as viewed from above the apparatus in FIG. 1 so that shaft 70 and the horseshoe magnet 73 mounted on the top of the shaft are rotated counterclockwise. When the magnet 73 is turned, its magnetic field obviously is similarly turned causing a corresponding counterclockwise movement of the pointer 75 or the dial 99 in the indicator 90 so that the rate of filling and the quantity of liquid in the tank supporting the float 52 is shown by the indicator.

After the tank 11 has been filled to the desired depth and the filling hose has been disconnected, the liquid may be withdrawn through the fitting 40 by connection of a suitable hose or conduit, not shown, to the fitting and leading to the particular unit using the liquid, such as a heater or cooking facility. The characteristics of liquified petroleum gas are such that the liquid vaporizes and passes through the valve as a gas. The withdrawal path is the same as in filling through the chamber portion 20, the passage 23, around the valve 42, and through the chamber 44 and outwardly through the fitting 40. As the liquid is withdrawn the float 52 is lowered in the tank rotating the rod 53 and the shaft 55 along with the bevel gear 64 in a clockwise direction. The bevel gear 64 meshing with the bevel gear 65 turns the gear 65 and its shaft 70 in a clockwise direction. The rotation of the magnet 73 on the shaft 70 effects a corresponding clockwise movement of the pointer 75 or the dial 99 toward the empty mark on the indicator scale.

At any time during the presence of the liquid 12 in the tank that the pressure exceeds a predetermined safe level, the force of the pressure through the chamber portion 20 and the passage 22 to the inside face of the relief valve 32 forces the valve outwardly against the spring 33 permitting fluid escape through the chamber 34 and the relief port 31 lowering the pressure within the tank. When the pressure reaches the level determined by the characteristics of the spring and related valve parts, the spring returns the safety valve to its closed position over the bore 22.

The isolation of the dial indicator 51 or 90 from the tank interior permits indicator removal without emptying the tank or disturbing its contents or any of the other structure of the valve.

If replacement of the entire valve and indicator combination is desired, the tank is completely emptied and other suitable safety precautions are taken to insure against fire or explosion. With the tank empty, the float 52 along with the rod 53 and the counterweight 60 are at a near-vertical position as determined by the relative dimensions of the gears and other related parts of the float system. The float is so designed that the float rod and counterweight will come to a sufficiently vertical position that when the valve body 14 is unthreaded from the fitting portion 13 of the tank, the float assembly may be maneuvered through the opening in the fitting 13. Similarly, in replacing the valve and indicator unit, the float assembly is maneuvered into the tank in its substantially vertical position.

What is claimed and desired to be secured by Letters Patent is:

1. An integrated combination liquid level indicator and flow valve for use with a tank having a storage chamber therein comprising: a hollow non-magnetic body having thread means along one end portion thereof for securing to a fitting on said tank and having an elongated central chamber communicating with said tank when said body is secured with said tank; said body being provided with a lateral pressure release flow passage in one side of said body communicating with said chamber in said body; a relief valve secured on said body over said pressure release flow passage for permitting fluid flow from said chamber of said tank when the pressure therein exceeds a predetermined value; said body having a fluid inlet and outlet flow passage communicating with said chamber in said body said passage having a first portion aligned with said pressure release passage on the opposite side of said body and a second portion normal to said first portion and opening to the outside of said body; a valve secured with said body for movement between open and closed positions in said first portion of said inlet and outlet flow passage for controlling fluid flow into and out of said chamber of said tank through said second passage portion of said body; a tubular support member secured with said body and disposed along one end portion within said chamber of said tank when said body is secured with said tank and along the other end portion in concentric spaced relation in said body chamber; bearing means connected with said other end portion of said support member; a rotatable shaft disposed through said bearing means having a first end terminating in said chamber of said tank and a second end terminating in said chamber of said body near the upper end thereof; a first bevel gear on said first end of said shaft; a second bevel gear rotatably secured with said support member in said chamber meshing with said first bevel gear; a float rod secured with said second bevel gear; a float secured on one end of said float rod for moving said rod responsive to the liquid level in said tank to rotate said bearing supported shaft; a counterweight secured on the other end of said rod; a magnet secured on said second end of said shaft at the upper end of said chamber in said body; said body having an upwardly opening recess in the top thereof separated from said chamber of said body; and a magnetically responsive indicator dial supported in said body recess and observable from outside said body, said indicator dial being rotated responsive to said magnet on said shaft for indicating the liquid level in said chamber of said tank.

2. A liquid level indicator and valve in accordance with claim 1 wherein said indicator dial is removably pressure isolated from said chamber of said tank whereby said dial is removable from said body when said chamber is under pressure.

3. A liquid level indicator and valve in accordance with claim 2 wherein said dial is top reading only.

4. A liquid level indicator and valve in accordance with claim 2 wherein said dial is top and side reading.

* * * * *